Dec. 31, 1929.    A. MELDRUM    1,742,044
VEHICLE WHEEL
Filed Feb. 1, 1927
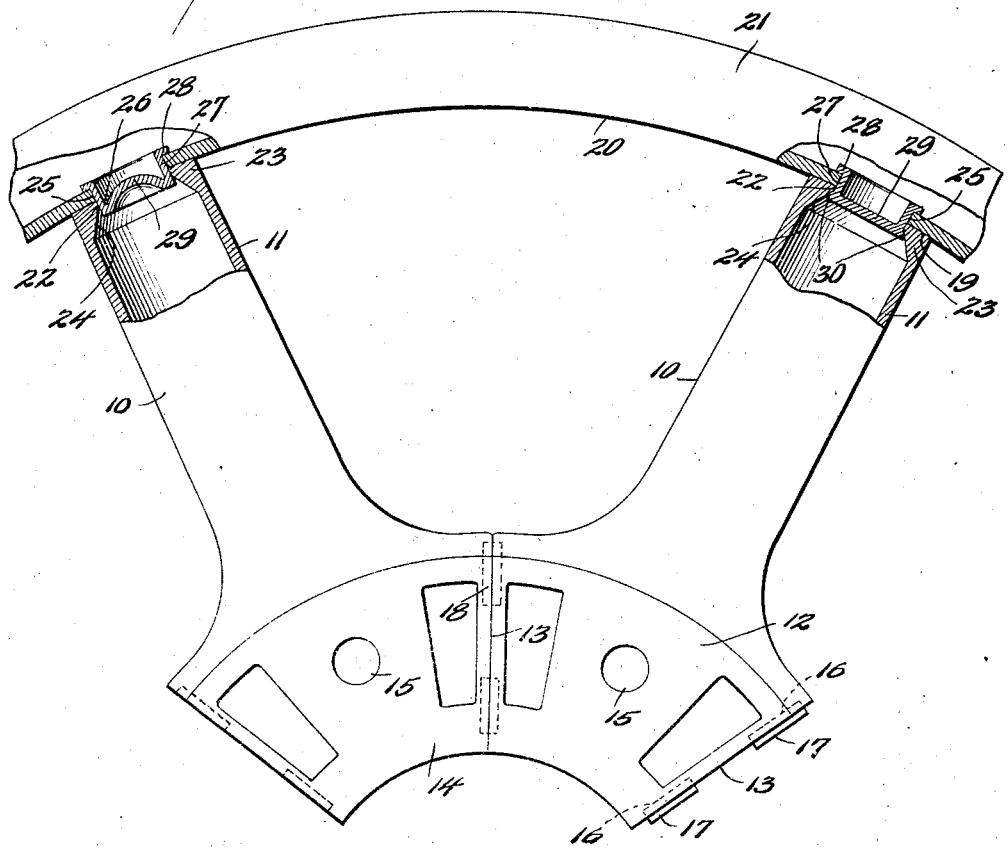
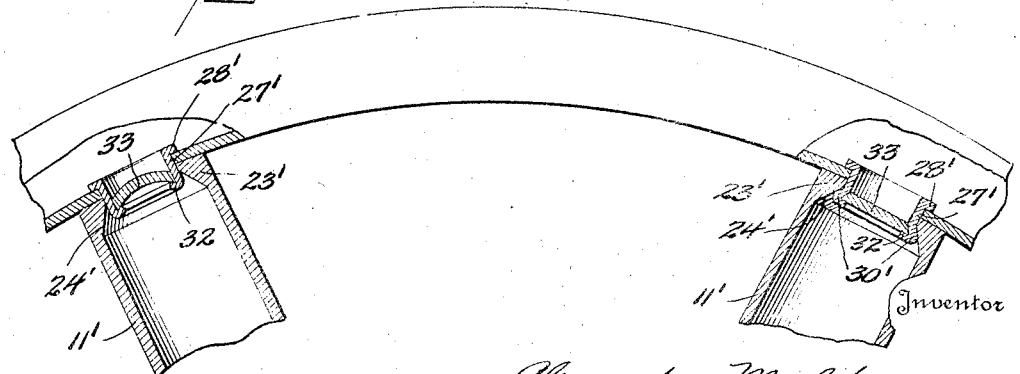
Inventor
Alexander Meldrum,
By Watson, Coit, Morse
  & Grindle    Attorney Patented Dec. 31, 1929

1,742,044

UNITED STATES PATENT OFFICE

ALEXANDER MELDRUM, OF SYRACUSE, NEW YORK, ASSIGNOR, BY MESNE ASSIGNMENTS, TO HURLBURT W. SMITH AND WILBERT L. SMITH, BOTH OF SYRACUSE, NEW YORK

VEHICLE WHEEL

Application filed February 1, 1927. Serial No. 165,219.

This invention relates to vehicle wheels and more particularly to all-metal vehicle wheels having a plurality of individual spokes.

It is a general object of the present invention to provide a novel and improved form of all-metal vehicle wheel.

More particularly it is an object of this invention to provide, in an all-metal vehicle wheel, an improved means for and method of attaching the ends of the spokes to the felloe.

Another object of the invention consists in providing a means for attaching the ends of the spokes to the felloe in such a manner that all of the spokes may be first assembled into a spider, over which the felloe is shrunk or otherwise contracted, after which the fastening means is applied to each spoke end.

A further object of the invention consists in the provision of a vehicle wheel having hollow cast-metal spokes, each spoke being provided at its outer end with a surface adapted to abut the inner surface of the felloe, a hole being provided in the felloe and in the spoke end of less diameter than the hollow of the spoke, together with a flanged thimble adapted to have a press fit in the said holes and to have its bottom part forced into the hollow of the spoke after it has been placed in position.

A still further object of the invention consists in the provision of a method of assembling a vehicle wheel, comprising; securing the inner ends of a plurality of spokes together to form a spider, placing the felloe over said spider, contracting said felloe against the ends of the spokes, driving hollow flanged members through holes in the felloe and spoke ends and expanding the inner ends of said hollow members within the spokes by a force applied only from without the felloe toward the center of the wheel.

Other and further objects and features of the invention will be more apparent to those skilled in the art after a consideration of the accompanying drawing and following specification wherein are disclosed two exemplary embodiments of the invention, with the understanding however that various changes may be made therein such as fall within the scope of the appended claims without departing from the spirit of the invention.

In said drawing:

Figure 1 is a side elevation of two spokes of a vehicle wheel, the ends of the spokes and portions of the felloe being sectioned on a median plane to show the method of attaching the same together; and Figure 2 is a view similar to Figure 1 showing a modification.

It has been the custom in the construction of spoked wheels to provide the ends of the spokes with tenons or the like which fit into suitable mortises or recesses in the felloe. To assemble such a wheel requires either a sectional felloe, a two part hub, or a pyramiding of the spokes with the tenons started in the mortises and then a flattening of the pyramid to drive the tenons into the mortises. The first two of these methods are impractical in the manufacture of wheels intended for use on motor vehicles for they either lack strength or their appearance is undesirable. The other method is more or less impractical with short spokes such as used in present day vehicles and if resorted to results in a poor fit between each spoke end and the felloe. At best it can only be done with spokes which are more or less compressible such as wood. The present invention contemplates a method of attaching the spoke ends to the felloe which overcomes all of the above objections and affords a rigid and secure joint which will remain tight throughout a long period of use.

Referring to the drawing there is disclosed at 10 a pair of spokes which are preferably formed from cast metal such as a malleable iron. They are hollow and are provided with the thin outer walls 11. The inner ends of the spokes are segmental such as shown at 12 and provided with the radial faces 13. Such radial faces on adjacent spokes abut each other so that the segmental ends 12 of the full complement of spokes form what may be termed a nave or hub adapted to receive, on the flat surfaces 14, the usual hub discs or plates bolted to the spokes by means of bolts passing through the holes 15 in the inner ends thereof. The segmental inner ends of the spokes are also hollow for the sake of lightness. It is desirable that the segmental ends be securely attached together before the hub-plates are applied in order that the method of assembly of the wheel, to be later described, may be carried out by combining all of the spokes into a spider of rigid construction. For this purpose each face 13 is provided with a plurality of recesses 16 into which the dowels 17 may be driven. One face at each pair of meeting radial faces 13 is provided with dowels and by a radial inward movement of the spokes they are all pressed together so that a fit such as shown at 18 is obtained. The dowels fit tightly in the recesses and require a considerable pressure to be driven home. When complete the structure is rigid and the spokes are held against radial or lateral movement in respect to each other.

The outer ends 19 of the spokes are finished off to a configuration similar to that of the inner periphery 20 of the felloe 21. This felloe is preferably formed as a continuous circle of rolled steel of a more or less U-shaped cross-section to receive the usual demountable rim, not shown. After the spoke spider has been assembled as just described, the felloe is placed thereover. It may normally have a slightly less diameter than the diameter across the faces 19 of the spokes and may be heated to expand the same so that it may be slipped over the spider, after which, upon cooling it contracts and fits tightly against the ends 19 of the spokes. The dowels 17 prevent radial inward movement of any of the spokes and preserve the proper circular configuration of the felloe. If desired, the felloe may normally be larger than across the faces 19 and may be contracted over the spider in any of the methods well known in connection with the applying of metal tires to wagon wheels or the like.

The end of each spoke is provided with a hole 22 through the thickened end wall 23. From the bottom of the hole 22 the walls 24 taper outwardly to meet the walls 11 of the main portion of the spoke, which portion may be of any suitable cross-sectional configuration. The holes 25 are formed in the felloe previous to applying the same to the spider and these holes are preferably of the same diameter as the holes 22 and are adapted to substantially register therewith when the felloe is in position over the spokes.

In order to securely attach each spoke end to the felloe there is provided a metal cup 26 having a circular wall 27 which may if desired be slightly tapered from the inner to the outer end and which is flanged outwardly as at 28. The wall 27 is of such diameter that it will tightly fit in both the holes 22 and 25 and must be driven into the position shown in the left hand spoke of Figure 1 by the use of considerable force. The amount of inward movement of the member 26 is limited by the flange 27 engaging against the outer face of the felloe metal. The inner end of the wall 27 projects below the beginning of the taper 24 as shown in Figure 1. The integral bottom 29 of the cup 26 is convex toward the open end thereof as clearly shown. After the cup has been driven to the position shown in the left hand spoke of Figure 1, force is applied to the convex side of the bottom 29 and it is flattened to the position shown in the right hand spoke of Figure 1. This flattening produces an increase in diameter of the bottom 29 which forces with it the portion of the wall 27 surrounding it, until this wall assumes the position shown in the right hand spoke of Figure 1 and as at 30 engages under the tapered portion 24 of the spoke end. This expansion tightly draws the felloe and spoke end together, effecting a rigid and secure connection against lateral or radial movement of the spoke in respect to the felloe. The thickened end of the spoke resists any cracking or breaking due to the expansion of the member 26.

The cup 26 being made of a malleable material may be readily positioned and formed as shown. In order to position and form the same in the spoke end, one or two simple operations may take place and they are entirely effective from outside the felloe. There is no need of using a tool on the inside of the spoke to form what may be considered a head on the inner end of the cup, this head being formed entirely by the expansion of the bottom 29 when it is flattened. The flange 28 is effective in preventing the cup from being driven too far into the felloe and spoke when pressure is applied to flatten the bottom 29. It also serves to lock the cup to the felloe.

In Figure 2 the spokes and felloe are identical with those of Figure 1 and have been given corresponding numbers with primes. The cup used to secure the spoke ends to the felloe is however, made in two parts. It comprises a tubular sleeve having an outwardly turned flange 28' and a substantially cylindrical wall 27'. At its inner or lower end however, it is provided with an inwardly turned flange 32, which is below the beginning of the taper 24' in the spoke end. The bottom of the cup is an independent disc 33 which is cupped as shown and has its convex side outward. It is of such a diameter as to snugly fit within the cylindrical portion 27' of the sleeve. The sleeve is forced into position, with or without the disc in place, until it assumes the position shown in the left hand spoke of Figure 2. If the disc was not placed in the sleeve in the beginning, it is now put in position and force is applied to its convex side as in the previous form to flatten it out as shown in the right hand spoke in Figure 2.

This flattening produces a result substantially identical with that produced in Figure 1 and causes the part 30' to be forced under the taper 24' in the spoke end. The flange 32 is of sufficient strength to retain the bottom 33 against being driven through the sleeve. The bottom is forced tightly against the walls of the sleeve and serves to effectively retain the wall 27' against the spoke in order to insure a tight joint.

A wheel constructed according to the present invention is as light in weight as the corresponding wood wheel and has considerably greater strength against destruction. It may be constructed more cheaply, can be painted more readily, and the appearance is equal to, if not better than that of the usual wood wheel. The cost of manufacture is extremely low owing to the simplicity of the operations necessary to form and assemble the parts of the wheel.

Having thus described the invention what is claimed as new and desired to be secured by Letters Patent is:

1. The combination with a vehicle wheel including a metal felloe, a plurality of hollow metal spokes, each spoke having its outer end tightly abutting the inner periphery of said felloe and having a hole in the outer end thereof, said hole increasing in diameter toward the inner end of the spoke, the felloe having a hole substantially concentric with each spoke end hole of a hollow member passing through each felloe hole and into the corresponding spoke end hole, said member having a flange engaging the outer surface of the felloe and having its inner end expanded into engagement with the wall of the larger portion of the spoke end hole.

2. The combination with a vehicle wheel including a metal felloe, a plurality of hollow metal spokes, each spoke having its outer end tightly abutting the inner periphery of said felloe, the spoke end being thickened and having a substantial straight radial hole therein, outwardly flaring walls intermediate said hole and the main spoke walls, said felloe having a hole therethrough substantially concentric with each spoke end hole of a metal tube in each set of spoke and felloe holes and tightly engaging the walls thereof, a flange on said tube engaging the outer surface of said felloe and a bottom for said tube expanding and holding a portion of the wall thereof in engagement with said flaring spoke wall.

3. The combination with a vehicle wheel including a metal felloe, a metal spoke, said spoke being hollow and having a thickened outer end with a hole therethrough of less diameter than the hollow of the spoke, said end tightly abutting said felloe with said hole substantially concentric to a hole in said felloe, of a cup having a tight fit in both said holes, a flange on said cup tightly engaging the outer surface of said felloe, the inner end of said cup being larger in diameter than the hole in said spoke end.

In testimony whereof I hereunto affix my signature.

ALEXANDER MELDRUM.